US006986131B2

(12) United States Patent
Thompson et al.

(10) Patent No.: US 6,986,131 B2
(45) Date of Patent: Jan. 10, 2006

(54) METHOD AND APPARATUS FOR EFFICIENT CODE GENERATION FOR MODULO SCHEDULED UNCOUNTED LOOPS

(75) Inventors: Carol L. Thompson, San Jose, CA (US); Uma Srinivasan, Sunnyvale, CA (US); Richard E. Hank, San Jose, CA (US); Dale Morris, Steamboat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 559 days.

(21) Appl. No.: 10/175,375

(22) Filed: Jun. 18, 2002

(65) Prior Publication Data

US 2003/0233643 A1 Dec. 18, 2003

(51) Int. Cl.
*G06F 9/45* (2006.01)
(52) U.S. Cl. .................. 717/160; 717/150; 712/241; 712/233
(58) Field of Classification Search ................ 717/106, 717/149–150, 158–161; 712/233–236, 241

See application file for complete search history.

(56) References Cited

U.S. PATENT DOCUMENTS 5,327,561 A 7/1994 Choi et al.

OTHER PUBLICATIONS

Daniel M. Lavery and Wen-mei W. Hwu, Modulo Scheduling of Loops in Control-Intensive Non-Numeric Programs, 0-8186-7855-0/96 $5.00 (c) 1996 IEEE, 12 pages.
B.R. Rau, et al. "Code Generation Schemas for Modulo Scheduled DO-Loops and WHILE-Loops"; pp. 1-35, Hewlett-Packard Laboratories Technical Report HPL-92-47, Apr. 1992.
Parthasarathy Tirumalai, et al. "Parallelization of Loops with Exits on Pipelined Architectures"; pp. 1-18, Hewlett-Packard Laboratories Technical Report HPL-90-107, Aug. 1990.
Jay Bharadwaj, et al. "The Intel IA-64 Compiler Code Generator"; pp. 44-52, IEEE Micro, Sep.-Oct. 2000.
B. Ramakrishna Rau, "Interative Modulo Scheduling"; pp. 1-67, HP Laboratories Technical Report HPL-94-115, Nov. 1995.

Primary Examiner—Antony Nguyen-Ba

(57) ABSTRACT

A method of efficient code generation for modulo scheduled uncounted loops includes: assigning a given stage predicate to each instruction in each stage, including assigning a given stage predicate to each instruction in each speculative stage; and using the stage predicate to conditionally enable or disable the execution of an instruction during the prologue and epilogue execution.

16 Claims, 19 Drawing Sheets

---

```
                                                  700
Formulation                        FRP = first rotating predicate
                                   FRP = e.g., p16
The first stage predicate = FSP
No. of speculative states = SS
Stage of predicate of compare controlling loop condition = CSP
Special static predicate = SP 1) The FSP will always be greater than or equal to p16 + SS.
2) All predicates from (FSP - SS) to the FSP will be initialized to 1.
   The rest will be initialized to zero.
3) The wtop will always get the FSP - 1 predicate.
4) The compare controlling the loop back branch condition will be a
   normal cmp that writes into both the wtop predicate and a
   special static predicate SP. Let's call this inst. CMP1. Note that
   the wtop predicate will be true when the condition is true and
   false otherwise. The static predicate will be initialized to false
   and continue to be so when the condition is true. Otherwise it
   will be set to true and will retain it's true value.
5) An additional cmp will push zeroes into CSP as follows. It will
   be predicated on SP. It will write zero into CSP - 1. It will have
   to be scheduled after CMP1 and before the wtop of that stage.
   Let's call this inst. CMP2.

For the case where SS=0, FSP has to be greater than p16, SP=p0
and step 5 above is unnecessary.

In our example we have
SS=2
FSP=p18
CSP=p20
SP=p1 p16, p17 and p18 initialized to 1 and the rest zero.
wtop is predicated by p17.
CMP1 is predicated by p20 and writes into both p17 and p1.
CMP2 is predicated by p1 and writes zero into p19.
```

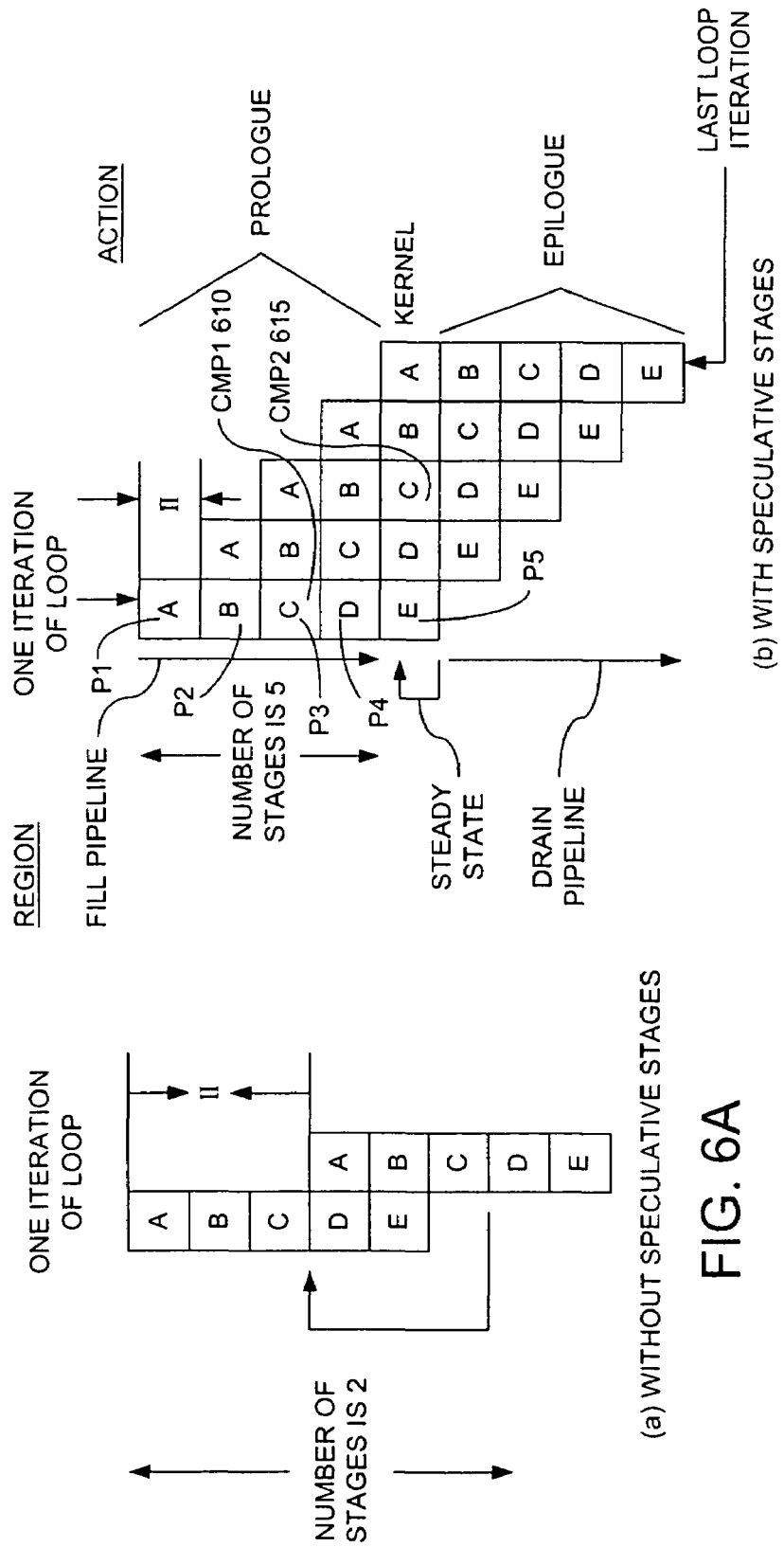

Formulation

FRP = first rotating predicate
FRP = e.g., p16

The first stage predicate = FSP
No. of speculative states = SS
Stage of predicate of compare controlling loop condition = CSP
Special static predicate = SP 1) The FSP will always be greater than or equal to p16 + SS.
2) All predicates from (FSP - SS) to the FSP will be initialized to 1. The rest will be initialized to zero.
3) The wtop will always get the FSP - 1 predicate.
4) The compare controlling the loop back branch condition will be a normal cmp that writes into both the wtop predicate and a special static predicate SP. Let's call this inst. CMP1. Note that the wtop predicate will be true when the condition is true and false otherwise. The static predicate will be initialized to false and continue to be so when the condition is true. Otherwise it will be set to true and will retain it's true value.
5) An additional cmp will push zeroes into CSP as follows. It will be predicated on SP. It will write zero into CSP - 1. It will have to be scheduled after CMP1 and before the wtop of that stage. Let's call this inst. CMP2.

For the case where SS=0, FSP has to be greater than p16, SP=p0 and step 5 above is unnecessary.

In our example we have
SS=2
FSP=p18
CSP=p20
SP=p1 p16, p17 and p18 initialized to 1 and the rest zero.
wtop is predicated by p17.
CMP1 is predicated by p20 and writes into both p17 and p1.
CMP2 is predicated by p1 and writes zero into p19.

FIRST II:

[p1 p17 p16]
 0   1   1
p22 p21 p20 p19 p18
 0   0   0   0   1

| E- | D- | C- | B- | A1 |

CMP1 and CMP2 are predicated off
wtop is predicated ON by p17 after CMP1:
p22 p21 p20 p19 p18
 0   0   0   0   1
after CMP2:
p22 p21 p20 p19 p18
 0   0   0   0   1

SECOND II:

[p1 p17 p16]
 0   1   0
p22 p21 p20 p19 p18
 0   0   0   1   1

| E- | D- | C- | B1 | A2 |

CMP1 and CMP2 are predicated off
wtop is predicated ON by p17 after CMP1:
p22 p21 p20 p19 p18
 0   0   0   1   1
after CMP2:
p22 p21 p20 p19 p18
 0   0   0   1   1

FIG. 7C

THIRD II:
In the third II, the compare in C is finally predicated on.
Assume that the
execute the loop body three times.) This is the first time, it sets
p17 to 1 and p1 to 0

[p1  p17  p16]
        0    0    0
p22  p21  p20  p19  p18
 0    0    1    1    1

| E- | D- | C1 | B2 | A3 |

CMP1 is predicated on
CMP2 is still predicated off after CMP1:
       [p1  p17  p16]
        0    0    0
p22  p21  p20  p19  p18
 0    0    1    1    1
after CMP2:
       [p1  p17  p16]
        0    1    0
p22  p21  p20  p19  p18
 0    0    1    1    1

FIG. 7D

FOURTH II:
In the fourth II, the compare in C again writes 1 to p17 and 0 to p1.

[p1  p17  p16]
        0    0    0
p22  p21  p20  p19  p18
 0    1    1    1    1

| E- | D1 | C2 | B3 | A4 |
|----|----|----|----|----|

Compare in C writes 1 to p17 after CMP1:
       [p1  p17  p16]
        0    1    0
p22  p21  p20  p19  p18
 0    1    1    1    1 after CMP2:
       [p1  p17  p16]
        0    1    0
p22  p21  p20  p19  p18
 0    1    1    1    1

FIG. 7E

FIFTH II:
In the fifth II, the compare in C evaluates to false, and p17 is set to 0. Note that, since we have a stream of 0's being written to p16 (by the WTOP), the branch predicate will never again be 1. However, p1 is now set to 1 and it will take care of pushing 0's into p20, the predicate guarding the compare.

```
      [p17 p16]
        0   0
 p22 p21 p20 p19 p18
  1   1   1   1   1
```

| E1 | D2 | C3 | B4 | A5 |
|----|----|----|----|----|

Compare in C writes 0 to p17 and 1 to p1
CMP2 is predicated ON.

after CMP1:
```
     [p1 p17 p16]
       1   0   0
 p22 p21 p20 p19 p18
  1   1   1   1   1
```
after CMP2:
```
     [p1 p17 p16]
       1   0   0
 p22 p21 p20 p19 p18
  1   1   1   0   1
```

FIG. 7F

SIXTH II:
In the sixth II, and
Stages D and E complete for the last two iterations.

[p1 p17 p16]
       1   0   0
p22 p21 p20 p19 p18
 1   1   0   1   0

| E2 | D3 | C- | B4 | A- |

Compare in C remains predicated off after CMP1:
      [p1 p17 p16]
       1   0   0
p22 p21 p20 p19 p18
 1   1   0   1   0
after CMP2:
      [p1 p17 p16]
       1   0   0
p22 p21 p20 p19 p18
 1   1   0   0   0

FIG. 7G

SEVENTH II:
In the seventh, and final, II, the E stage of the third iteration executes, and the epilog counter runs out, so we will exit.

```
      [p1  p17  p16]
       1   0    0
p22  p21  p20  p19  p18
 1    0    0    0    0
```

| E3 | D- | C- | B- | A- |   Compare in C is predicated off after CMP1:
```
      [p1  p17  p16]
       1   0    0
p22  p21  p20  p19  p18
 1    0    0    0    0
```
after CMP2:
```
      [p1  p17  p16]
       1   0    0
p22  p21  p20  p19  p18
 1    0    0    0    0
```

Now we execute the A and B stages 5 times each corresponding to three actual loop iterations. Also, B does not execute before the data it requires is valid.

We need to schedule CMP2 after all instructions in B stage to avoid gaps in B stage execution.

FIG. 7H

METHOD AND APPARATUS FOR EFFICIENT CODE GENERATION FOR MODULO SCHEDULED UNCOUNTED LOOPS

TECHNICAL FIELD

Embodiments of the present invention relate generally to methods and apparatus for efficient code generation for modulo schedule loops.

BACKGROUND

A compiler is a computer program that transforms a source computer program written in one language, such as Java, C or C++, into a target computer program that has the same meaning but is written in another language, such as an assembler or machine language. Compiler tasks are described in further detail in, for example, *Compilers: Principles, Techniques, and Tools* by A. Aho et al. (Addison Wesley, 1998), which is hereby fully incorporated herein by reference.

A compiler that is particularly well suited to one or more aspects of the code optimization task may be referred to as an optimizing compiler. One strategy that an optimizing compiler may pursue focuses on optimizing transformations, which are described in D. Bacon, et al., "Compiler Transformation for High-Performance Computing," in *ACM Computing Surveys*, Vol. 26, No. 4 (Dec. 1994), which is hereby fully incorporated herein by reference. Such transformations typically involve high-level, machine-independent, programming operations (i.e., "high level optimizations") including, for example, removing redundant operations, simplifying arithmetic expressions, moving code that will never be executed, removing invariant computations out of loops, and storing values of common subexpressions rather than repeatedly computing them.

Other strategies that an optimizing compiler may pursue focus on machine-dependent transformations (i.e., "low level optimizations"), and include instruction scheduling and register allocation.

A principal goal of some instruction scheduling strategies is to permit two or more operations to be executed in parallel, a process referred to as instruction level parallel (ILP) processing, which is typically implemented in processors with multiple execution units. One way of communicating with the central processing unit (CPU) of the computer system is to create very long instruction words (VLIWs), which specify the multiple operations that are to be executed in a single machine cycle. For example, a VLIW may instruct one execution unit to begin a memory load and a second execution unit to begin a memory store, while a third execution unit is processing a floating point multiplication. Each execution task has a latency period (i.e., the task may take one, two, or more cycles to complete). The objective of ILP processing is to optimize the use of the execution units by minimizing the instances in which an execution unit is idle during an execution cycle. ILP processing may be implemented by the CPU and/or by an optimizing compiler.

In many applications, the majority of execution time is spent in loops. One known technique for improving the instruction level parallelism (ILP) in loops is referred to as "software pipelining". The operations of a single loop iteration are separated into s stages. After transformation, which may require the insertion of startup code to fill the pipeline for the first s−1 iterations and cleanup code to drain the pipeline for the last s−1 iterations, a single iteration of the transformed code will perform stage 1 from pre-transformation iteration i, stage 2 from pre-transformation iteration i−1, and so on. Such single iteration is known as the kernel of the transformed code.

A particular known class of algorithms for achieving software pipelining is commonly referred to as "modulo scheduling", as described in James C. Dehnert and Ross A. Towle, "Compiling for the Cydra 5," in *The Journal of Supercomputing*, volume 7, (Kluwer Academic Publishers, Boston 1993), which is hereby fully incorporated herein by reference. Modulo scheduling is also described in the following reference, which is hereby fully incorporated herein by reference: B. R. Rau, "Iterative Modulo Scheduling," in *The International Journal of Parallel* Processing, volume 24, no. 1 (February 1996). Modulo scheduling initiates loop iterations at a constant rate called the initiation interval (II).

However, it would be desirable to further optimize the machine code that is generated by use of modulo scheduling techniques.

SUMMARY

In accordance with an embodiment of the invention, a method of efficient code generation for modulo scheduled uncounted loops includes: assigning a given stage predicate to each instruction in each stage, including assigning a given stage predicate to each instruction in each speculative stage; and using the stage predicate to conditionally enable or disable the execution of an instruction during the prologue and epilogue execution.

In accordance with another embodiment of the invention, an apparatus for modulo scheduling, includes: a modulo scheduler configured to assign a given stage predicate to each instruction in each stage including assigning a given stage predicate to each instruction in each speculative stage, the modulo scheduler configured to use the stage predicate to conditionally enable or disable the execution of an instruction during the prologue and epilogue execution.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

FIGS. 6(a) and 6(b) are block diagrams that show an example of a code generation method for while loops.

FIGS. 7(a) to 7(h) show tables for the purpose of describing an example method of using predication and speculation, in accordance with an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention is implemented in, for example, a compiler that generates code for the Itanium architecture, and which utilizes features of the Itanium architecture to enable the invention. An example of such a compiler is available from Hewlett-Packard Company, Palo Alto, Calif.

Figure 1:
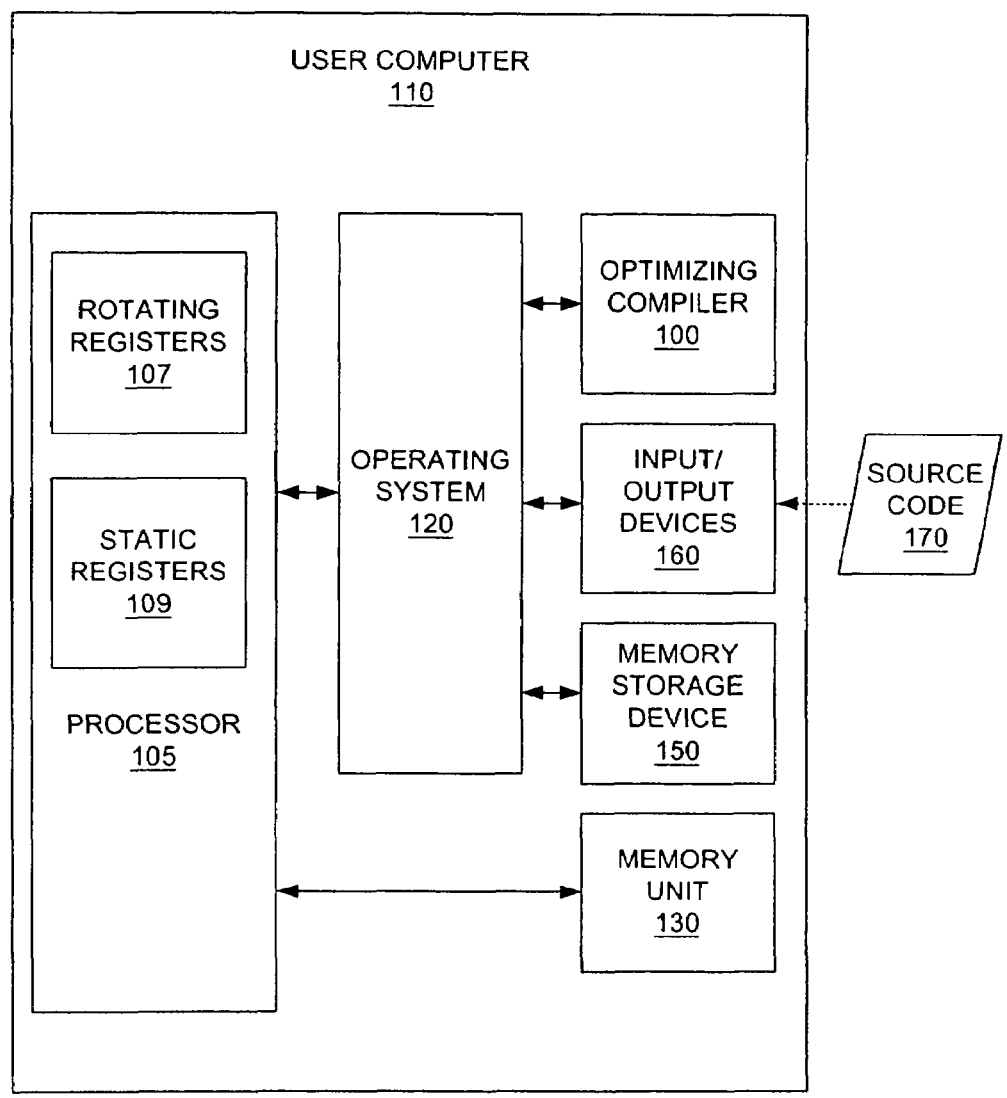
FIG. 1 is a simplified functional block diagram of a user computer that can implement an embodiment of the invention.

FIG. 1 is a simplified functional block diagram of a user computer 110 that can implement an embodiment of the invention. The user computer 110 may be a personal computer, network server, workstation, or other computer platform now or later developed. The user computer 110 may also be a device specially designed and configured to support and execute the functions of an embodiment of the scheduler-assigner 420 as described below. The user computer 110 typically includes known components including a processor 105, operating system 120, memory unit 130, memory storage device 150, and input-output devices 160. It will be understood by those skilled in the art that there are many possible configurations of components of the user computer 110 and that some components that may typically be included in the user computer 110 are not shown, such as, for example, a video card, data backup unit, and other suitable devices.

The processor 105 may be any suitable processor now known or later developed, and in one embodiment may include the rotating registers 107 (described below) or similar devices or techniques. The processor 105 may also include the static registers 109 (described below) or similar devices or techniques. In another embodiment, the rotating registers 107 and/or static registers 109 may be external to the processor 105. In another embodiment, the processor 105 may be a variation of any of a variety of suitable processors that do not currently have rotating registers, but could be modified to include the rotating registers.

The processor 105 can execute an operating system 120 which may be any suitable known operating system or later developed operating system.

The memory unit 130 may be any known memory storage device or future memory storage device, including, for example random access memory (RAM), magnetic medium such as a hard disk, or other types of memory storage devices. For example, the memory unit 130 may include dynamic random access memory chips and/or may include a cache memory that may be formed by static random access memory chips. In another embodiment, all or a portion of the memory unit 130 may be located on the same chip as the processor 105.

The memory storage device 150 may be any known or future device, including, for example, a compact disk drive, a tape drive, a removable hard disk drive, or a diskette drive. Such types of memory storage device 150 typically read from and/or write to program storage devices (not shown).

Computer software programs are typically stored in the main memory 130 and a program storage device accessible by the memory storage device 150. The programs may also be dynamically generated. Such computer software programs, when executed by the processor 105, enable the user computer 110 to perform various functions, such as, for example, functions of embodiments of the invention.

The input-output devices 160 could include any suitable known devices for accepting information from a user, whether a human or a machine, whether local or remote. Such devices may include, for example, a keyboard, mouse, touch-screen display, touch pad, voice input device, network card, modem, or other suitable input devices. The input-output devices 160 could include any suitable known devices for presenting information to a user, whether a human or a machine, whether local or remote. Such devices may include, for example, a video monitor, printer, audio speaker, network card, modem, or other suitable output devices. The input-output devices 160 could also include any suitable removable storage devices, such as, for example, a CD-ROM drive, a tape drive, a removable hard disk drive, or a diskette drive.

A scheduler-assigner 420 (FIG. 4) could be implemented in, for example, C, C++, Fortran, or other suitable programming languages. The scheduler-assigner 420 could be implemented in software, hardware, firmware, or a combination thereof. If implemented in software, the scheduler-assigner 420 may be loaded into the memory storage device 150 by use of, for example, the input-output device 160. The scheduler-assigner 420 may also reside in a read-only memory or similar device of the memory storage device 150, where such devices do not require the scheduler-assigner 420 to first be loaded through the input-output device 160. The scheduler-assigner 420, optimizing compiler 100, or portions of either or both, may be typically implemented by the processor 105 in a known manner into the memory unit 130 as advantageous for execution.

The source code 170 may be written in any of variety of known or later developed computer languages, including Fortran, C, C++, and so on. The source code 170 may typically be loaded through input-output device 160, and a copy ("image") of the source code may be placed by the processor 105 into the memory storage device 150 or memory unit 130.

Figure 2:
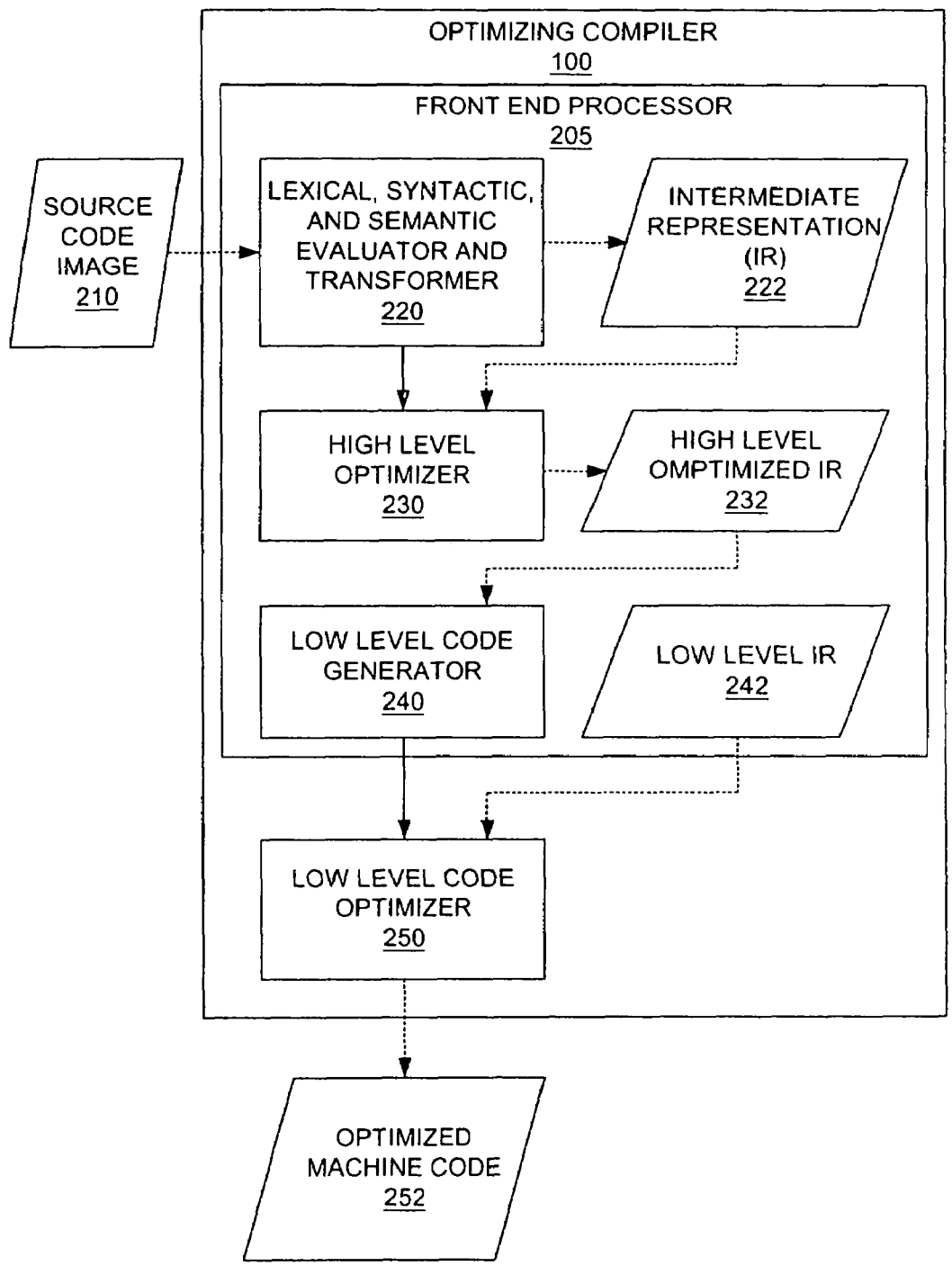
FIG. 2 is a block diagram of an optimizing compiler, in accordance with an embodiment of the invention.

FIG. 2 is a block diagram of an optimizing compiler 100, in accordance with an embodiment of the invention. The optimizing compiler 100 can optimize the execution of the source code 170, as described below. In an embodiment, the optimizing compiler 100 includes a front end processor 205 and a low level code optimizer 250. The front end processor 205 applies known, high level, typically machine-dependent, optimizing transformations to an image 210 of the source code 170. The result is a low level intermediate representation (IR) 242 of the source code 170 (or source code image 210). An intermediate representation is a representation of the source code image 210 to facilitate one or more operations of the optimizing compiler 100. The low level code optimizer 250 applies the low level, typically machine-dependent, optimizing transformations to the low level IR 242 to produce machine code 252 that may be directly executed by the processor 105 (FIG. 1).

In an embodiment, the front end processor 205 implements known high-level processing and optimization techniques to optimize the source code image 210 and to provide the high-level optimized code in an intermediate representation suitable for low level optimization. The front end processor 205 includes lexical, syntactic, and semantic evaluator and transformer 220. The transformer 220 performs various known operations on the source code image 210 to produce the intermediate representation (IR) 222. As known to those skilled in the art, these operations typically include lexical analysis of the source code image 210 to produce tokens for parsing and further analysis; syntactical analysis and translation based on the attributes of the programming language in which the source code image 210 is written; semantic evaluation; and other operations.

The front end processor 205 also includes a high level optimizer 230 which applies known high level optimization techniques to the IR 222. These high level optimization techniques include, for example, subprogram inlining, instruction and data cache usage optimizations, and advanced loop optimizations. The resulting optimized code is shown by the high level optimized IR 232.

The front end processor 205 also includes a low level code generator 240 which produces a machine-dependent representation of high level optimized IR 232 by use of a variety of known techniques. This machine-dependent representation is represented by the low level IR 242.

The low level code optimizer 250 assumes control from the low level code generator 240 and operates on the low level IR 242. The low level code optimizer 250 implements instruction scheduling, such as modulo scheduling, in accordance with an embodiment of the invention. The low level code optimizer 250 also performs register allocation, including allocation of rotating registers 107 and static registers 109.

Figure 3:
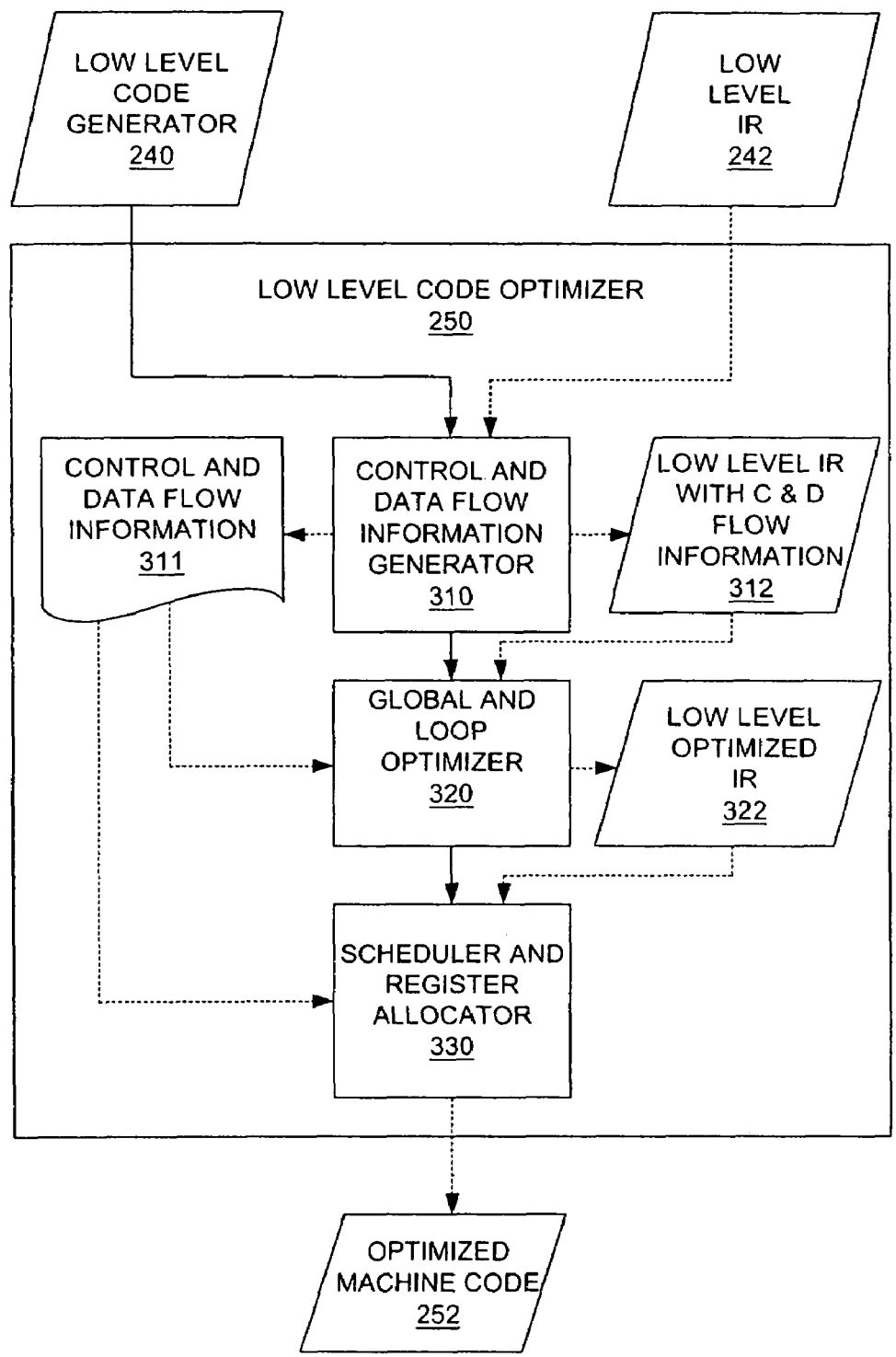
FIG. 3 is a block diagram of a low level code optimizer, in accordance with an embodiment of the invention.

FIG. 3 is a block diagram of a low level code optimizer 250, in accordance with an embodiment of the invention. The low level code optimizer 250 includes control and data flow information generator 310, global and loop optimizer 320, and scheduler and register allocator 330.

In an embodiment, the control and data flow information generator 310 employs any of a variety of known techniques in order to generate control and/or data flow information that is applied to the intermediate representation 242. In particular, in the example shown in FIG. 3, the generator 310 generates data-flow information that is subsequently used by the global scheduler 410 (in the scheduler and register allocator 330) and may, for example, be represented in static single assignment (SSA) form (see, e.g., U.S. Pat. No. 5,327,561 and ACM Transactions on Programming Languages, 13(4):452–490, October 1991) (or other suitable form). More generally, the data-flow information is used to ensure the correct identification of live ranges that are subject to various optimizations. The control-flow information that is generated by the generator 310 is used in accordance with known techniques to identify code structures, such as loops, that may be amenable to optimization techniques. The intermediate representation resulting from the operations of the generator 310 is shown in FIG. 3 as the low level IR with control and data (C & D) information 312.

The generator 310 also generates control and data flow information 311 by use of any one of a variety of known techniques such as, for example, the generation of a control flow graph. The control and data flow information 311 facilitates, in a known manner, the identification of live ranges of variables to ensure that transformations among various forms of representations do not cause register interference that might alter the meaning of the code. The information 311 also facilitates the identification of structures, such as loops, upon which known optimization techniques are applied.

The low level code optimizer 250 also includes a global and loop optimizer 320. The term "global" refers in this context to operations that are applied to a procedure as a whole, as contrasted, for example, with operations that are generally limited to a particular region of a procedure, such as a loop. The optimizer 320 assumes control from the control and data flow information generator 310 and operates upon the IR 312. In particular, the optimizer 320 applies to the IR 312 any of a variety of known global low level optimization techniques such as, for example, constant propagation, global code motion, copy propagation and elimination, register promotion, strength reduction on loops, and loop unrolling.

The intermediate representation resulting from the operations of the optimizer 320 is known as the low level optimized IR 322.

The scheduler and register allocator 330 operates on the IR 322 to produce the optimized machine code 252, which is the optimized machine-executable code that is the output of the optimizing compiler 100 (FIG. 2). More specifically, the scheduler and register allocator 330 performs instruction level machine-dependent scheduling, such as, for example, if-conversion, tree-height reduction, region scheduling, and modulo scheduling, in an embodiment of the invention. The scheduler and register allocator 330 also performs register allocation to optimally allocate static registers 109 and rotating registers 107 to instruction-scheduled code.

Figure 4:
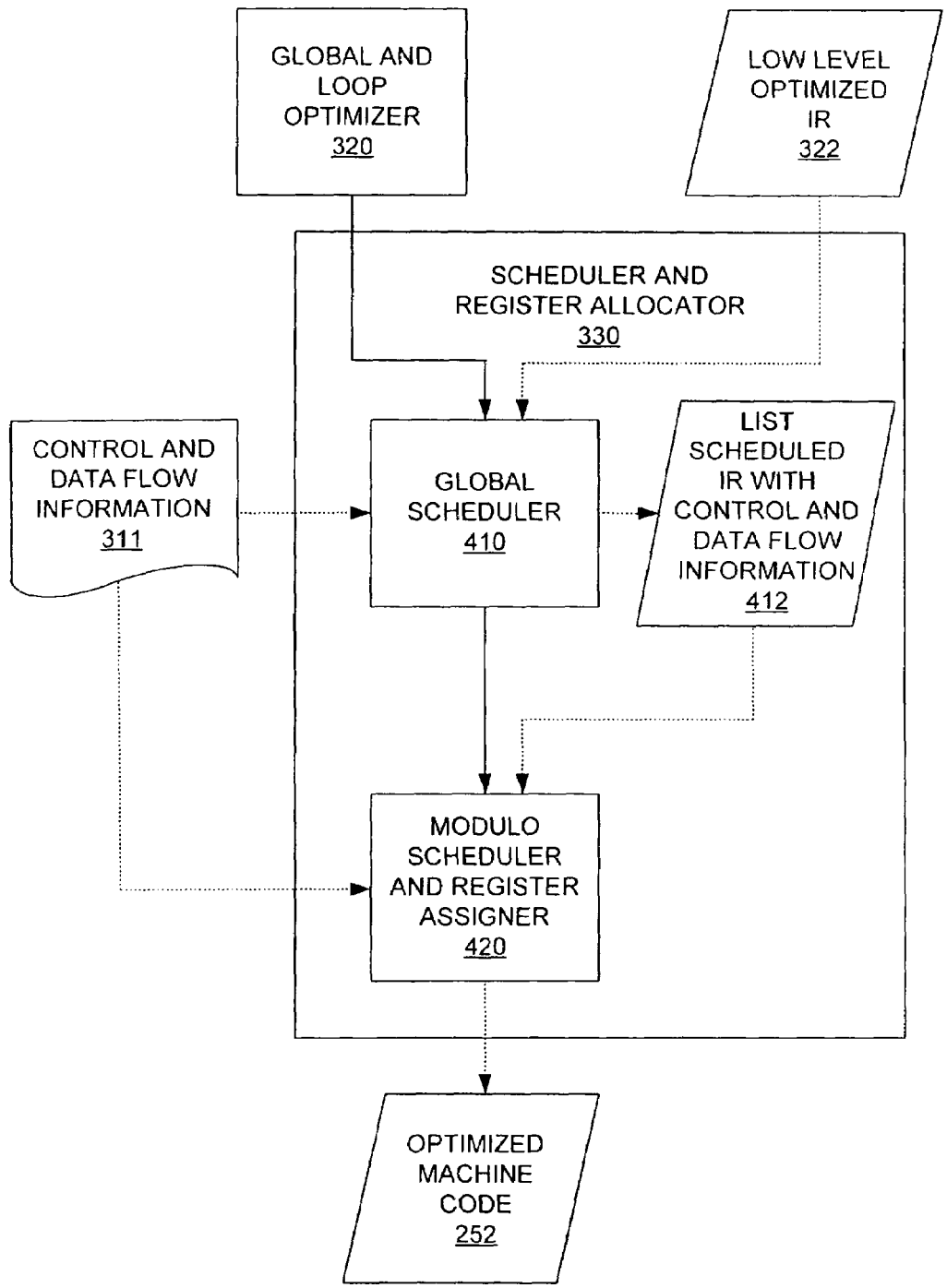
FIG. 4 is a block diagram of a scheduler and register allocator, in accordance with an embodiment of the invention.

FIG. 4 is a block diagram of a scheduler and register allocator 330, in accordance with an embodiment of the invention. The scheduler and register allocator 330 may apply known techniques such as global scheduling (i.e., instruction scheduling across an entire region or groups of regions; if-conversion, in some embodiments; and height-reductions, in some embodiments). The scheduler and register allocator 330 may also perform modulo scheduling techniques, in accordance with embodiments of the invention.

The global scheduler 410 assumes control from the global and loop optimizer 320 and operates upon the IR 322 to produce the list scheduled IR with control and data flow information (referred herein as list scheduled IR 412). The term "scheduled" indicates that instruction level parallel processing is implemented in IR 412. The term "list" indicates that the schedule is not a necessarily a packed schedule for loops such as those achieved by software pipelining techniques such as modulo scheduling.

More generally, it will be understood that the term "list scheduled intermediate representation with control and data flow information" (i.e., list scheduled IR 412) is used herein to refer to a scheduled intermediate representation that typically, in an embodiment, includes: (a) control and data flow information, as generated by, for example, the generator 310; and (b) the optimizations and other processes described above with respect to the operations of the front end processor 205. However, in other embodiments, the process of generating a list scheduled IR may exclude any one or more of the optimizations and other processes of the front end processor 205. For example, in an embodiment, a list scheduled IR 412 may not include high-level optimizations such as those typically provided by the high-level optimizer 230. Also, the global scheduler 410 does not necessary have to precede the scheduler-assigner 420 in the control flow sense. One could just as well perform modulo scheduling and register allocation in a non-list scheduled IR.

Figure 5:
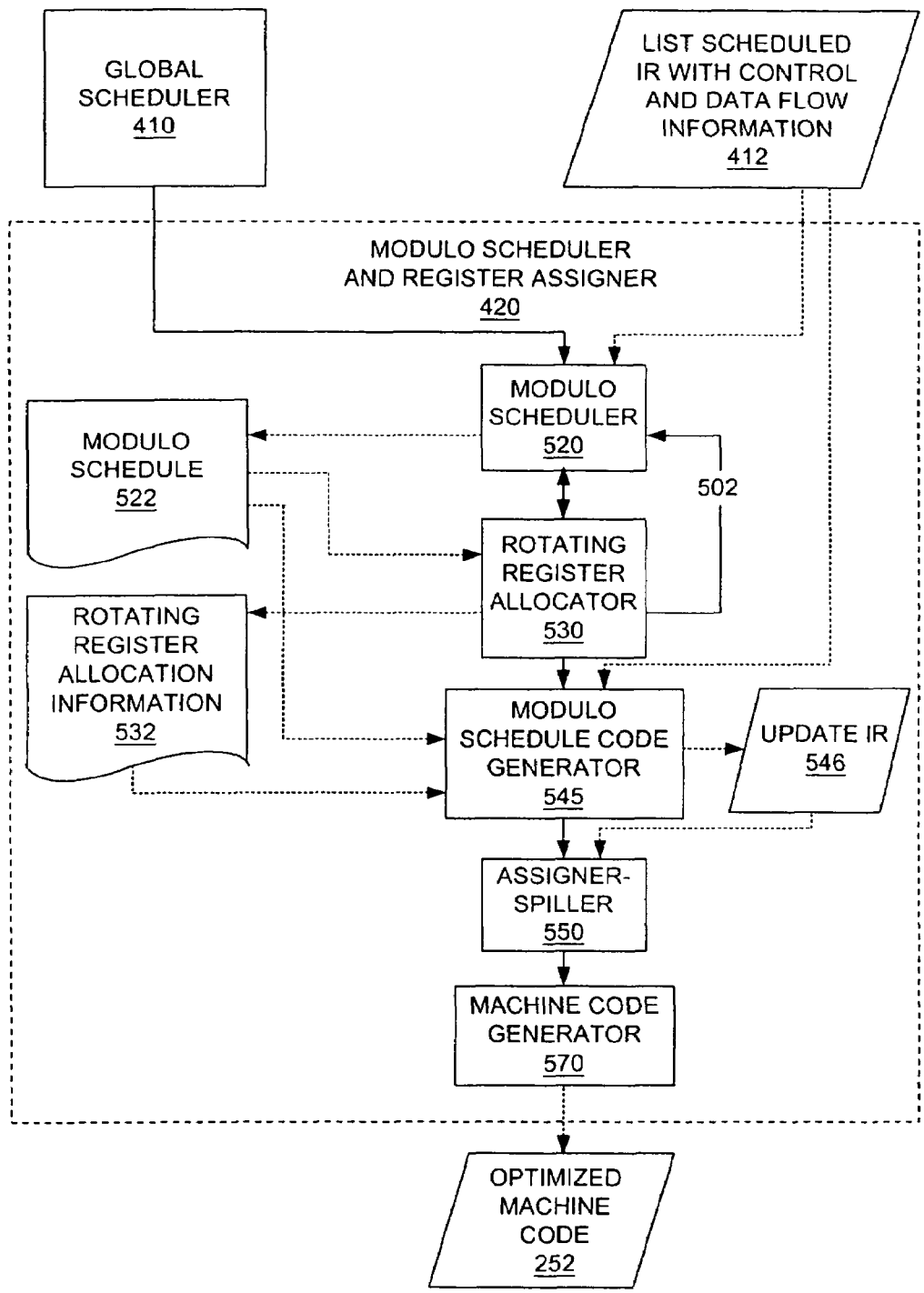
FIG. 5 is a block diagram of a modulo scheduler and register assigner, in accordance with an embodiment of the invention.

FIG. 5 is a block diagram of a modulo scheduler and register assigner 420 (i.e., scheduler-assigner 420), in accordance with an embodiment of the invention. The scheduler-assigner 420 performs modulo scheduling and register allocation to realize high degrees of instruction level parallelism by generating efficient code schedules and to make efficient use of hardware registers, as described in detail below. The modulo scheduler 520 assumes control from the global scheduler 410 and applies modulo scheduling to the IR 412 to produce modulo schedule 522.

Each modulo schedule has a prominent characteristic that is commonly referred to as its initiation interval ("II"). The term II refers to the initiation interval or the number of cycles that it takes to initiate a new iteration of the original loop. The term II is also the number of cycles required to complete each iteration in the kernel using the modulo schedule. Typically, an initial II is chosen which is at least as great as the minimum II. If a modulo schedule is not generated with this chosen particular II (i. e., a repeating kernel is not produced), then the II is incremented and a fresh attempt at generating a new modulo schedule (with the incremented II) is made.

The rotating register allocator 530 identifies live ranges of the loop-variant variables in the modulo schedule 522 and then allocates rotating registers accordingly. If there is not a sufficient number of rotating registers, then the allocator 530 returns (502) control to the modulo scheduler 520 so that the modulo scheduler 520 may increase the initiation interval and attempt to find a new modulo schedule 522. Typically, this process of finding a modulo schedule and determining whether there is a sufficient number of rotating registers to allocate to the modulo schedule is repeated until there are sufficient rotating registers for the modulo schedule, or a modulo schedule is not found within an acceptable number of iterations.

Information specifying the allocations that are made by the allocator 530, including identification of available rotating registers (i.e., excess rotating registers that need not be allocated by the allocator 530), is shown as the rotating register allocation information 532. This information 532 is provided to the modulo schedule code generator 545 which, in one embodiment, generates a modulo-scheduled intermediate representation (i.e., Updated IR 546) which includes rotating register allocations.

The generator 545 carries out these functions by employing the information of the modulo schedule 522 and rotating register allocation information 532 to produce the updated IR 546. This technique of generating the updated IR 546 is also described in detail in commonly-assigned pending U.S. patent application Ser. No. 09/567,188, filed May 09, 2000, entitled "METHOD, APPARATUS, AND PRODUCT FOR OPTIMIZING COMPILER WITH ROTATING REGISTER ASSIGNMENT TO MODULO SCHEDULED CODE IN SSA FORM", by common inventor Uma Srinivasan. U.S. patent application Ser. No. 09/567,188 is hereby fully incorporated herein by reference.

The static register assigner and memory spiller 550 (assigner-spiller 550) assigns static, real, registers in the IR to all allocated static, virtual, registers that remain in the updated IR (i.e., those that have not been replaced by the assignment of their live ranges to the rotating registers). In accordance with known techniques, the assigner-spiller 550 also inserts instructions as required into the IR to spill static registers to memory if an insufficient number of static registers 109 are available.

The machine code generator 570 transforms, in accordance with known techniques, the IR into the machine code 252 which can be directly executed by the processor 105.

Modulo Scheduling for Uncounted Loops

In general, modulo scheduling is one of a class of algorithms for achieving software pipelining, a purpose of which is to improve the instruction level parallelism (ILP) in loops. Software pipelining is analogous to hardware pipelining, which is a known technique for achieving the same purpose by implementing instruction execution in stages (such as, for example, fetch, decode, read, execute, and write-back) such that multiple instructions can be executing concurrently on the same functional unit. The essence of hardware pipelining is that the hardware begins execution of succeeding instructions before it completes the execution of prior instructions. Similarly, in software pipelining the main idea is to start subsequent pre-transformation loop iterations before prior pre-transformation loop iterations have completed. An iteration is defined by the beginning of a loop and a branch instruction at the end of the loop. The loop iterations are split into stages in modulo scheduling. These stages are analogous to the stages of a hardware execution pipeline. Moreover, modulo scheduling enables the optimizing compiler 100 to identify and exploit instruction level parallelism across loop iterations (hereinafter referred to as "overlapping" of iterations). In this case two or more instructions from different iterations of a loop may be scheduled in parallel. Thus, modulo scheduling attempts to achieve the performance benefits of completely unrolling the loop without actually doing so. The net result is that the interval between the initiation of successive iterations of the loops is less than the time that it takes to execute a single iteration.

However, achieving the overlapping of iterations typically requires the "unrolling" of the loop and software renaming of registers. The term "unrolling" refers to the practice of specifying the instructions of sequential iterations of a loop. The "rotating registers" in certain processors avoid the need to unroll the loops and allow software to use renamed registers. This renaming of registers by use of rotating registers is referred to as "register rotation". On the other hand, a register that is not a rotating register is referred to as a "static register".

Typically, register rotation is accomplished by changing the effective addresses of the rotating registers. For example, it is illustratively assumed that the processor 105 (FIG. 1) has three rotating registers 107, referred to as r1, r2, and r3. During a first iteration, the values contained in such registers are assumed to be, for example, 12, 24, and 36, respectively. During a second iteration, the effective addresses of these registers are changed so that the value that is stored in r1 during the first iteration is referenced by addressing r2 during the second iteration. Similarly, the value stored in r2 during the first iteration is found in r3 during the second iteration, and the value stored in r3 during the first iteration is found in r1 during the second iteration. Thus, in the second iteration, the values that may be referenced with respect to registers r1, r2, and r3 will be 36, 12, and 24, respectively. The use of rotating registers is also described in the above-noted commonly-assigned pending U.S. patent application Ser. No. 09/567,188, entitled "METHOD, APPARATUS, AND PRODUCT FOR OPTIMI ZING COMPILER WITH ROTATING REGISTER ASSIGNMENT TO MODULO SCHEDULED CODE IN SSA FORM".

It is also noted that an uncounted loop is a loop whose iteration depends on a condition computed within the loop. An uncounted loop may include, for example, "while loops" or counted loops with early exit branches. The uncounted loops can be modulo scheduled in several different ways. For example, a counted loop with early exit branches can be processed to have all branches in the loop combined and converted into a while loop, as discussed in P. Tirumalai et al., "Parallelization of Loops with Exits on Pipelined Architectures," Proceedings of the SuperComputing '90 (1190), 200–212, which is hereby fully incorporated herein by reference. A while loop can be modulo scheduled with the exit branches and explicit code generation of epilogue for each of the exits from the kernel, as described in D. M. Lavery et al., "Modulo Scheduling of Loops in Control-Intensive Non-Numeric Programs," Proceedings of Micro-29, 1996, 126–137, which is hereby fully incorporated herein by reference. Modulo scheduling of a while loop with kernel-only code can be performed by making use of speculation and predication, as described in B. R. Rau et al., "Code Generation Schemas for Modulo Scheduled DO-Loops and WHILE-Loops, Hewlett-Packard Laboratories Tech Report, HPL-92-47, April 1992, which is hereby fully incorporated herein by reference.

FIGS. 6(a) and 6(b) are block diagrams that show an example of a code generation method for while loops. FIG. 6(a) shows a code layout without speculative stages and where the number of stages is 2. FIG. 6(b) shows a code layout with speculative stages and where the number of stages is 5. The same pattern of operations is executed in each iteration of the steady state portion of the modulo schedule's execution. This behavior can be achieved by looping on a piece of code that corresponds to all stages in the steady state portion of the record of execution, and this piece of code is known as the "kernel". The record of execution leading up to the steady state is implemented with a piece of code called the "prologue". The record of execution following the steady state is implemented by a piece of code called the "epilogue". In FIG. 6(b), since stages A and B are executed before or in parallel with stage C which contains the loop control compare of the previous iteration, stages A and B are executed speculatively.

In one embodiment, the optimizing compiler 100 (FIG. 2) can perform at least one of the following functions or a combination of the following functions: (1) use speculation and predication to generate kernel-only code for while loops; (2) pre-process certain desirable counted loops with early exits to combine all the exit branches and convert the counted loops into while loops; (3) process/handle fully if-converted while loops; and/or (4) handle uncounted loops with explicit branches of control flow. As one example, the optimizing compiler 100 may include the HP C, C++, or Fortran compiler for the Itanium Processor Family architecture. The improved schedule for the loop permits reduced execution time.

(1) Use Speculation and Predication to Generate Kernel-only Code for While Loops:

In an embodiment, a method of the invention uses the kernel-only code schema to generate a modulo scheduled loop. The kernel-only code is generated by placing a stage predicate on the instructions in the speculative stages, as described below.

Speculative execution involves the execution of an operation before it is known that the operation should, in fact be executed. One way of achieving speculative execution (e.g., as shown in FIG. 6(b)) is by speculative code motion (i.e., by moving an operation up above the branch that could have directed flow of control away from this operation). In other words, speculation is the process of executing an instruction that may not be necessarily executed in the original loop, but is nonetheless executed and is guaranteed of having no ill-effects on program results.

In a while loop it is not known apriori whether instructions from subsequent pre-transformed loop iterations will execute until and unless the result of the loop control compare instruction is known. In order to execute instructions from subsequent iterations before the loop control compare from the current iteration, the instructions have to be executed speculatively. Therefore, the stages of instructions from subsequent iterations that are initiated before the loop control compare in the current iteration are called speculative stages.

There are several different ways of providing support for speculation of instructions. For example, the Itanium architecture provides speculative and non-speculative forms of certain instructions with side-effects such as load operations. Any such instruction that is scheduled in a speculative stage has to be of the speculative form and the compiler has to generate appropriate code for it.

Predication is the process of specifying whether a particular instruction(s) is to be executed by the computer hardware. A particular instruction is predicated by a predicate register operand whose value is set by instructions earlier in the instruction stream. Predicate registers can be static registers or rotating registers. An operation is conditionally executed based on the value of the predicate associated with the operation. Predicated execution permits the generation of more compact code by conditionally disabling the execution of operations during prologue and epilogue execution. The need to unroll a prologue and epilogue is eliminated, thereby supporting the generation of kernel-only code. Additional details on using predicates to generate kernel-only code are described in "Code Generation Schemas for Modulo Scheduled DO-Loops and WHILE-Loops", Computer Systems Laboratory, Hewlett-Packard Co., Technical Report HPL-92-47, which is hereby fully incorporated herein by reference.

In addition to using predicated execution to support the combining of prologue, kernel, and epilogue code, predicates are also used to enable modulo scheduling of loops containing conditional branches. Predicates permit the IF-conversion of the loop body, and this eliminates all branches within the loop body. The resulting branch-free loop body is modulo scheduled with kernel-only code.

In an embodiment of the invention, as shown in FIG. 6(b), a stage predicate is placed with instructions in all the stages, including instructions in the speculative stages, so that each instruction is predicated. Thus, predicate P1 is placed with speculative stage A; predicate P2 is placed with speculative stage B; predicate P3 is placed with stage C; predicate P4 is placed with stage D; predicate P5 is placed with stage E. In the prologue, the predicates turn on based on the following sequence. In the first initiation interval (II), P1 is first on. In the second II, P1 and P2 are on. In the third II, P1 to P3 are on. In the fourth II, P1 to P4 are on. This sequence of turning on the predicates is permitted by use of rotating registers (e.g., rotating registers 107 in FIG. 1).

When all 5 predicates P1–P5 are on (have a value of "1"), then the kernel is executed or vice versa. All stages A through E are active in the kernel.

In the epilogue, the predicates turn off based on the following sequence. If the original loop would have executed N times, then the $N+1^{st}$ II, P1 and P3 (P3 is the first non-speculative stage predicate) turn off. In the $N+2^{nd}$ II, P1 to P4 turn off.

As noted above, rotating registers can be used to generate stage predicates P1 to P5 to the instructions in all stages including speculative stages. Each stage is assigned a predicate. A rotating register may be, for example, a general purpose register, a floating point register, or a predicate register.

A compare instruction or a test instruction inside the loop determines the value of a stage predicate. As an example shown in FIG. 6(b), a compare instruction (or test instruction) 610, in stage C, is executed during run time and evaluates the original loop condition, i.e. the condition determining whether a new iteration of the loop should be initiated. Depending on what the loop control condition evaluates to at runtime when the instruction 610 is executed, a value of "0" or "1" will be written into its result predicate operands which are also the first stage predicate and the static predicate. If the condition is true, a value of "1" is written into its first predicate operand (which is one predicate before the first non-speculative loop predicate, or P2 in this example), and a value of "0" is written into its second predicate operand (which is the special static predicate Ps). When the condition is false, this indicates that no new iterations should begin, and a value of "0" is written into P2 in this example, and a "1" is written into Ps. This constitutes the beginning of the epilogue. In addition, the compare instruction 610 executes only when it's qualifying stage predicate P3 is "1" just like all other instructions in stage C.

The static predicate is used to guard a second instruction 615 (e.g., another compare instruction). When this instruction is executed it writes a "0" into the first non-speculative stage predicate (P3 in our example) and thereby squashes all operations from subsequent iterations because the loop is terminating. Since the loop control compare is guarded by the first non-speculative stage predicate, this mechanism ensures that instructions in speculative stages are squashed during loop termination. With these two instructions it is ensured that execution of both speculative and non-speculative stages is appropriately cancelled during loop termination. . A static register file (e.g., from static registers 109 in FIG. 1) may be used to generate the static predicate.

When the speculative stage A is turned off, stage A will not execute its load, and as a result, data flow into the cache is advantageously minimized since stage A will not bring in data into the cache.

By assigning stage predicates to instructions in the speculative stages, an embodiment of the invention typically avoids the unconditional and unnecessary execution of speculative loads.

The assignment of stage predicates also avoids the cost of bringing in unnecessary data into the data cache.

By assigning stage predicates to instructions in the speculative stages, an embodiment of the invention can speculatively schedule instructions that define values that are live out of the loop and recover these values from the rotating registers. For example, assume that a value X is loaded in a speculative stage of the loop and is used outside the loop. If the value X is assigned to a rotating register r1, the value X can be recovered from the appropriate rotating register because the load is governed by a stage predicate and the number of stages in the epilogue is known.

By using the kernel-only code schema, an embodiment of the invention permits the use of modulo scheduling techniques without incurring significantly larger code, hence making better use of the instruction cache of the computer 110.

FIGS. 7(a) to 7(h) show tables for the purpose of describing an example method of using predication and speculation, in accordance with an embodiment of the invention. The example values shown in FIGS. 7(a) to 7(h) are specific to the Itanium Family Processor architecture and may vary for other specific hardware.

FIG. 7(a) shows a table 700 with various example formulations. The first stage predicate (FSP) is equal to the number of speculative stages (FS) plus the first rotating predicate (FRP). In the example of table 700, FRP=p16, although other values may be set for FRP depending on the first rotating predicate. The term "wtop" refers to a modulo scheduling branch operation. This branch is guarded by a predicate (FSP-1) whose value is determined by the loop control compare operation CMP1. If the qualifying predicate is true, then the "wtop" branch performs some function. If the qualifying predicate is false, then the draining of the pipeline is set up. In this example, if a value of "1" is assigned to p17, the "wtop" branch executes in prologue or kernel mode. If a value of "0" is assigned to p17, the "wtop" branch executes in epilogue mode and all stages start the process of turning off. The static predicate (SP) is initialized to "0" and turns to "1" when CMP1 condition is false. Also, the first stage predicate (FSP) turns to "0" and starts to turn the speculative stages off. When SP turns to "1", then CMP2 fires and will drive "0" values into the stage predicates to start turning the non-speculative stages off.

FIG. 7(b) illustrates the values during the first initiation interval (II) in table 720. The first stage predicate (FSP=p18) is "1" and, therefore, stage A will be executed for the first time (as shown by A1). Stages B, C, D, and E are shown as B-, C-, D-, and E- because they are not executed.

FIG. 7(c) illustrates the values during the second II in table 730. Stage A is executed for the second time (as shown by A2) and stage B is executed for the first time (as shown by B1).

FIG. 7(d) illustrates the values during the third II in table 740. The compare (CMP1) in stage C is finally predicated on. Assume that the condition is true for two iterations (and so the pre-transformed loop body is executed three times). During the first time, p17 is set to "1" and p1 is set to "0".

FIG. 7(e) illustrates the values during the fourth II in table 750. The compare in stage C again writes "1" to p17 and "0" to p1.

FIG. 7(f) illustrates the values during the fifth II in table 760. The compare in stage C evaluates to false, and p17 is set to "0". Note that, since there is a stream of zeros 0s) being written to p17 (by the wtop), the branch predicate will not be "1" again. However, p1 is now set to "1" and it will take care of pushing zeros into p20, which is the predicate guarding the compare. In FIG. 7(f), after the kernel is executed, the CMP1 is writing a false value and the static predicate turns on. As a result, CMP2 is predicated on because p1 is set to "1".

FIG. 7(g) illustrates the values during the sixth II in table 770. The compare in stage C is predicated off again. Stages D and E complete their execution for the last two iterations.

FIG. 7(h) illustrates the values during the seventh II in table 780. The stage E of the third iteration executes, and the epilog counter will run out, and there is then an exit from the loop.

Figure 8A:
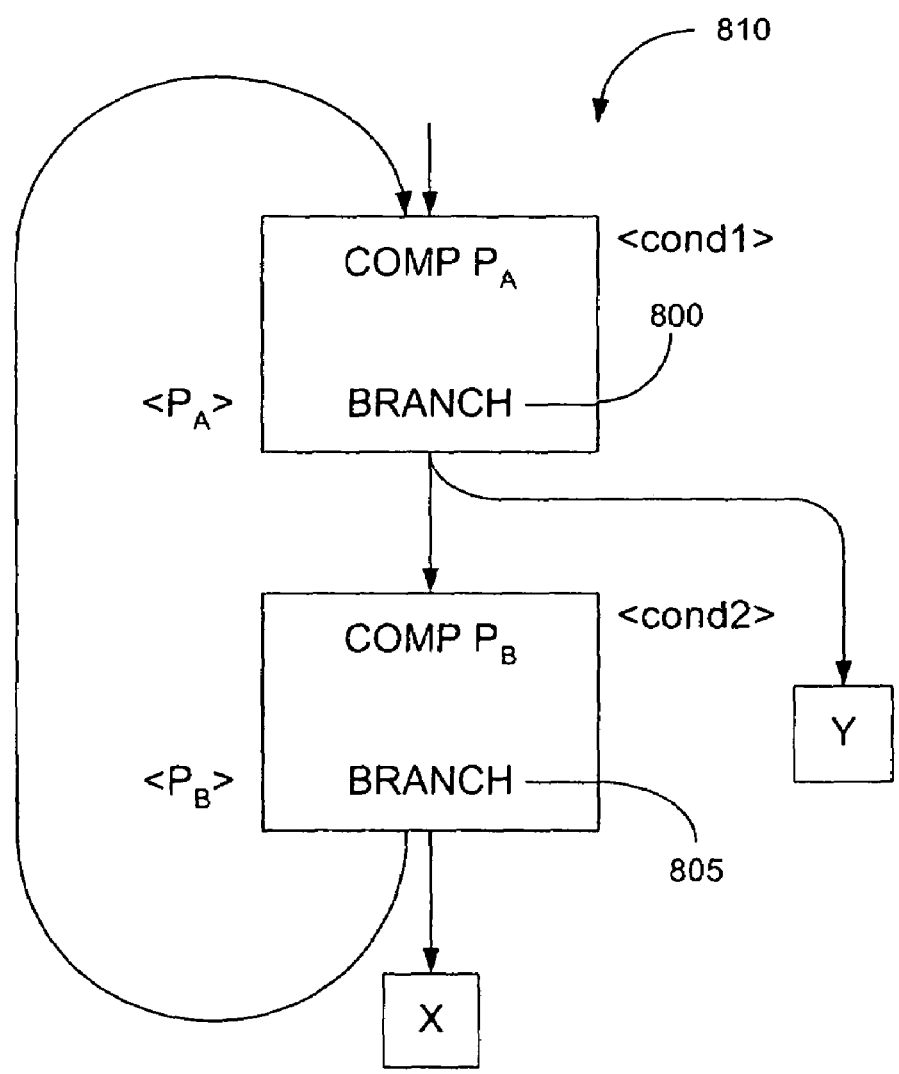
FIG. 8(a) illustrates an example of an intermediate representation that includes basic blocks, where there are multiple exit branches including an exit branch in the middle of the loop.

(2) Pre-process Certain Desirable Counted Loops with Early Exits to Combine all the Exit Branches and Convert the Counted Loops into While Loops:

FIG. 8(a) illustrates an example of an intermediate representation 810 that includes basic blocks, where there are multiple exit branches including a branch exit 800 in the middle of the loop. Assume that branch exits 800 and 805 are in the example immediate representation 810.

Figure 8B:
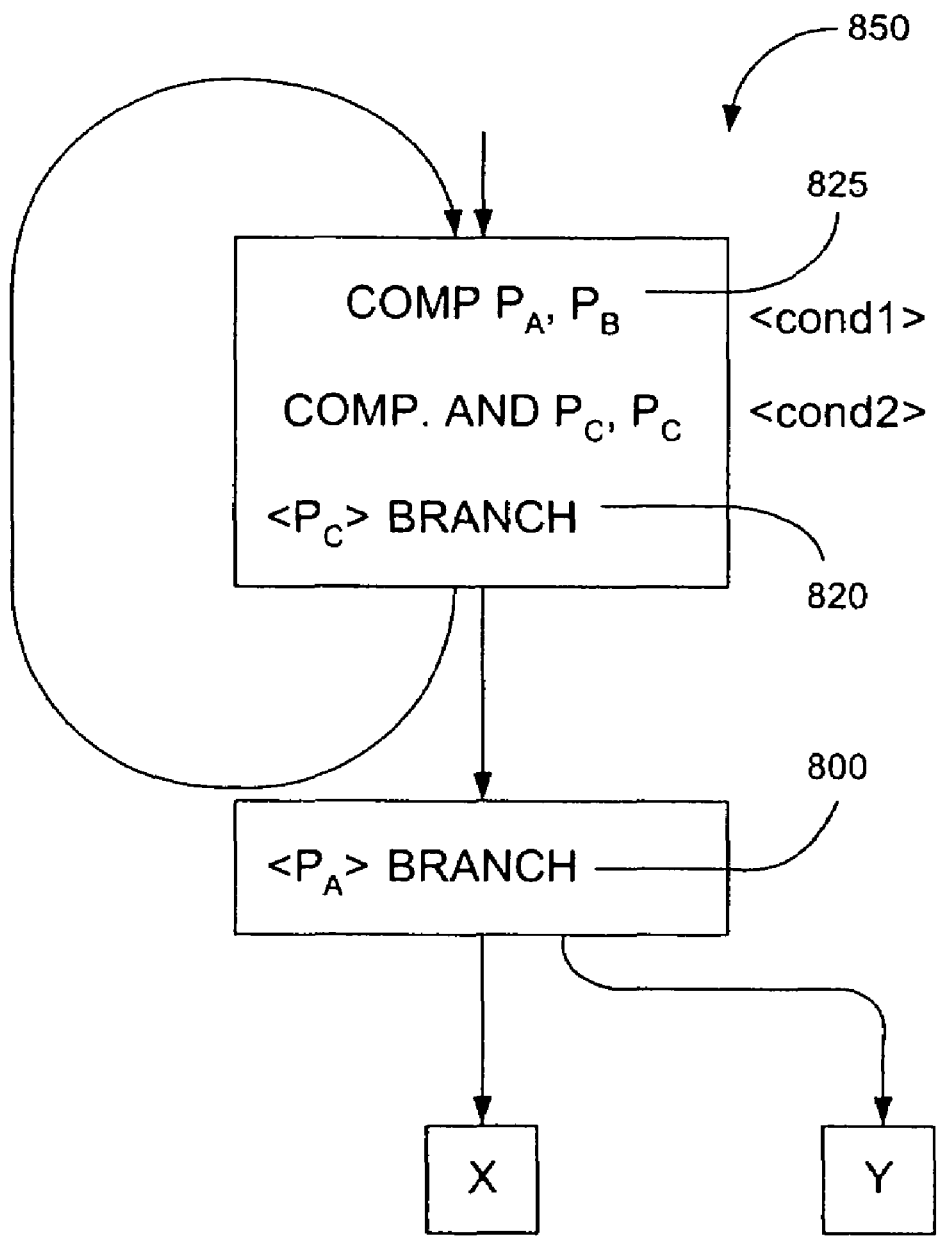
FIG. 8(b) shows an intermediate representation, where an if-converter converts the multiple branch exits of FIG. 8(a) into a single branch exit.

FIG. 8(b) shows an intermediate representation 850, where an if-converter converts the multiple branch exits 800 and 805 into a single branch exit 820 from the loop. A compare operation is executed (825) in order to set the values of predicates PA and PB. The values of the predicates PA and PB can be used to determine which path to take from the exit branch 820.

(3) Processing/Handling of If-converted While Loops:

A while loop (i.e., uncounted loop) is a loop where it is uncertain during the compiling of the program how many times the loop body will be executed for a given entry into the loop. If the loop has instructions (due to if-conversion) predicated on the branch predicate and scheduled after the first stage, a copy of the predicate has to be generated and these instructions have to be predicated with the copy.

Figure 9A:
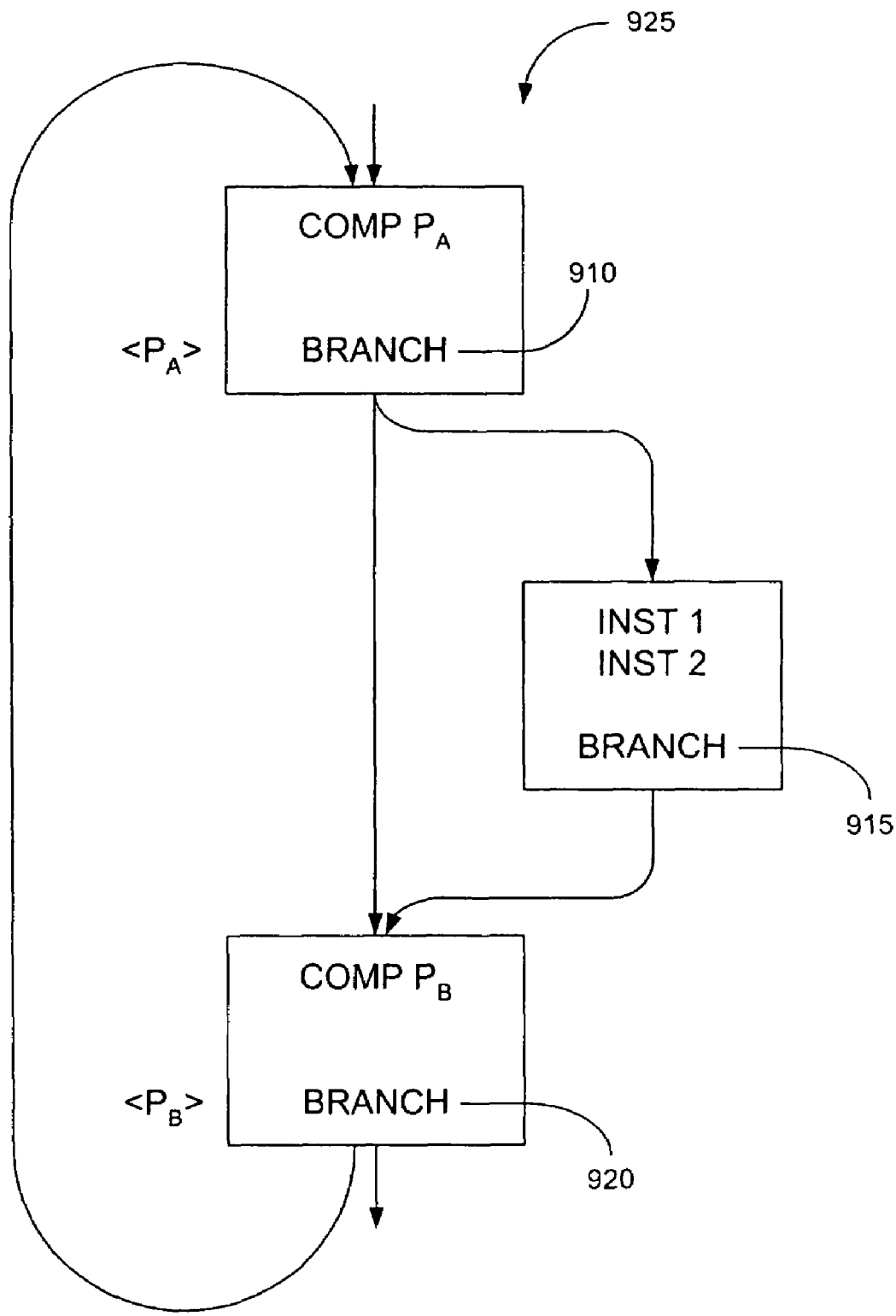
FIG. 9(a) illustrates an example of an intermediate representation that includes basic blocks, where if-conversion has not been performed so that multiple branches are in the intermediate representation.

FIG. 9(a) illustrates an example of an intermediate representation 925 that includes basic blocks, where if-conversion has not been performed so that multiple branches 910, 915, and 920 are in the intermediate representation 925.

Figure 9B:
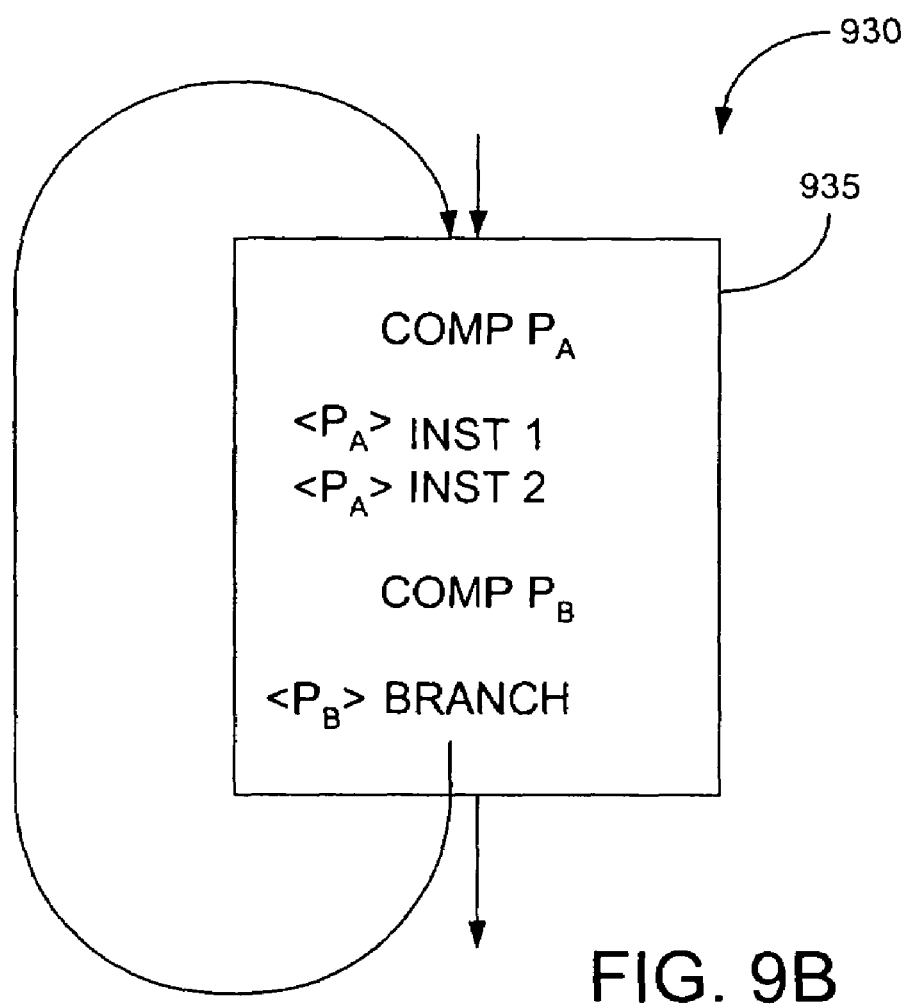
FIG. 9(b) shows an intermediate representation, after if-conversion is performed on the intermediate representation of FIG. 9(a).

FIG. 9(b) shows an intermediate representation 930, after if-conversion is performed on the intermediate representation 925. Branches 910, 915 are removed, and a single block 935 is obtained. The compare operation "comp" guards multiple instructions that are predicated. In the example in FIG. 9(b), instructions inst1 and inst2 are predicated by predicate PA.

Figure 10A:
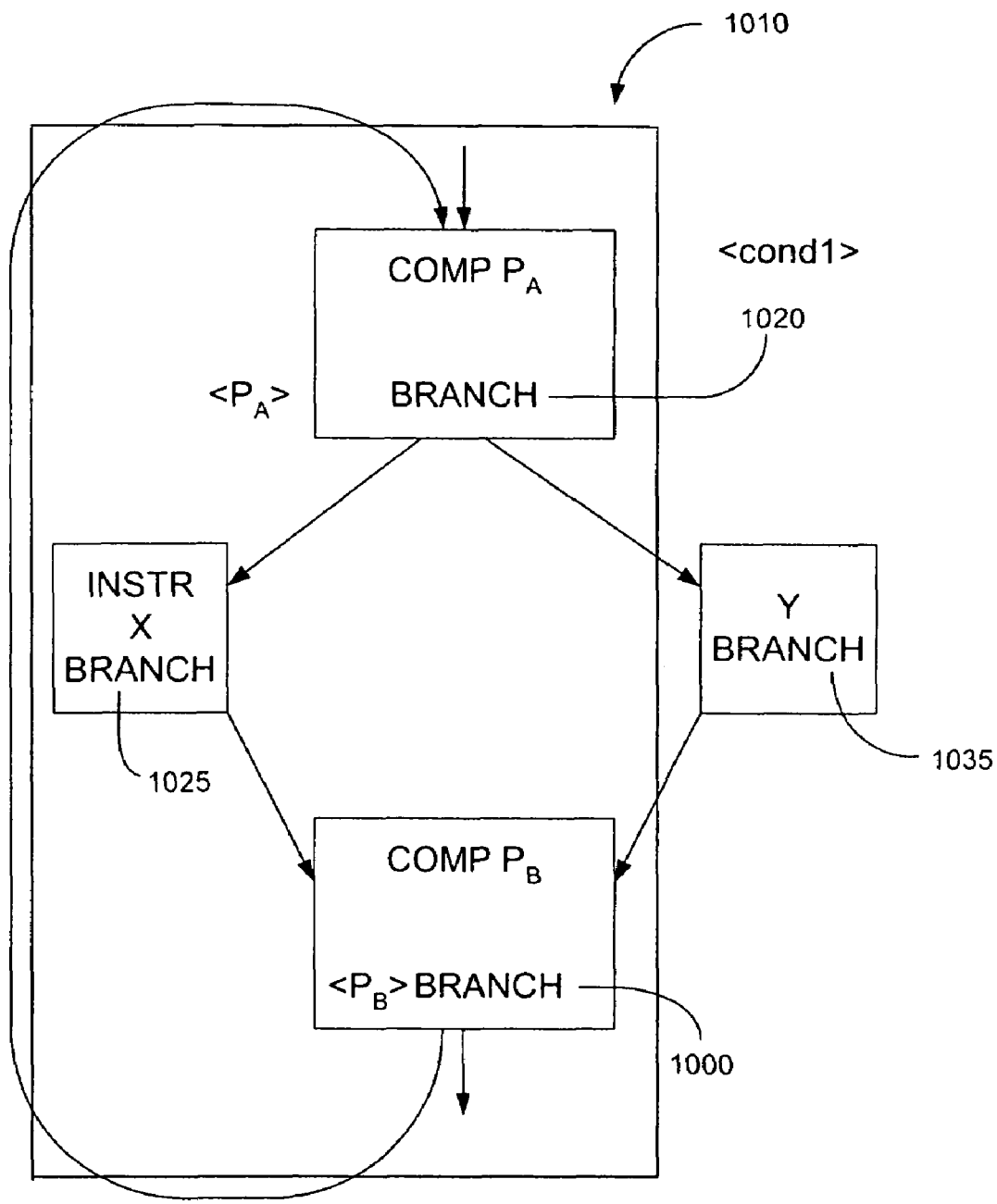
FIG. 10(a) illustrates an example of an intermediate representation that includes a loop with multiple basic blocks.

(4) Handle Uncounted Loops with Explicit Branches of Control Flow:

Explicit branches of control flow in loops are not necessarily exit branches. They may be branches that branch to a code and that code branches back to the loop, where the code is not modulo scheduled. FIG. 10(a) illustrates an example of an intermediate representation 1010 that includes basic blocks, where branch 1020 branches to a code Y, and code Y includes a branch 1035 that branches back to the loop. The code Y is not modulo scheduled. Branch 1020 also branches to a code X that is modulo scheduled, an d code X includes a branch 1025.

Figure 10B:
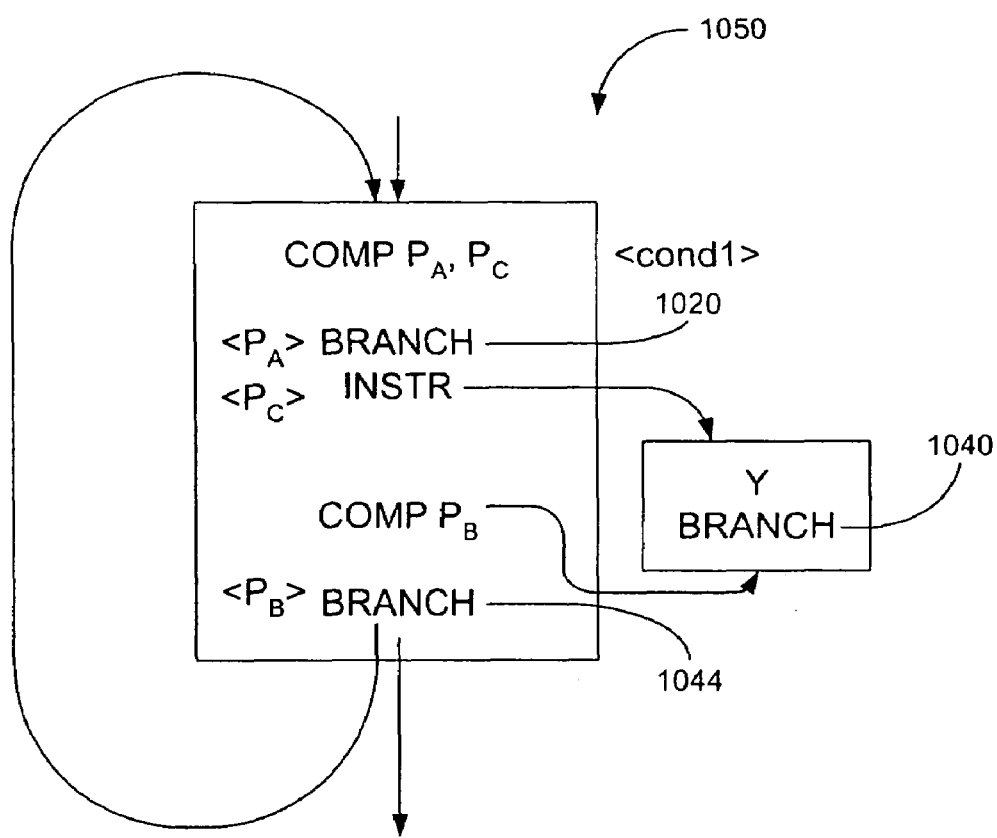
FIG. 10(b) shows an intermediate representation where blocks in the most frequent path are kept in the main trace to be modulo scheduled and all other blocks in other paths are pushed out off-trace.

FIG. 10(b) shows an intermediate representation 1050 after it is pre-processed and branches internal to the loop are not removed by if-conversion. The branch 1040 in code Y will branch back to a single block 1044.

The various engines discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A computer-implemented method of efficient code generation for modulo scheduled uncounted loops, the method comprising:

assigning a given stage predicate to each instruction in each stage, including assigning a given stage predicate to each instruction in each speculative stage;

using the given stage predicate to conditionally enable or disable the execution of an instruction during a prologue excecution and an epilogue execution;

executing a first compare instruction inside an uncounted loop to determine if a new iteration of the uncounted loop is to be prevented;

if a new iteration of the uncounted loop is to be prevented, then setting a static predicate to a value one, wherein the static predicate is in a kernel which is a code corresponding a steady state portion of a record of execution and wherein the static predicate guards a second compare instruction; and when the static predicate is set to the value one, executing the second compare instruction to terminate any subsequent iteration of the uncounted loop.

2. The computer-implemented method of claim 1, wherein an instruction executes if a stage predicate has first value, and the instruction does not execute if the stage predicate has a second value.

3. The computer-implemented method of claim 1, wherein a compare instruction or test instruction inside the uncounted loop determines the value of a stage predicate.

4. The computer-implemented method of claim 1, further comprising:
using rotating registers to hold the value of the stage predicates.

5. The computer-implemented method of claim 1, further comprising:
using the static predicate to turn off non-speculative stages in the epilogue while using a loop control compare to turn on and off speculative stages.

6. The computer-implemented method of claim 5, wherein the use of the static predicate prevents the flow of unnecessary data into a data cache.

7. The computer-implemented method of claim 1, wherein a stage predicate assigned to instructions in a speculative stage permits the speculative scheduling of instructions that define values that are live out of the loop.

8. The computer-implemented method of claim 1, wherein the use of stage predicates prevents the flow of unnecessary data into a data cache.

9. The computer-implemented method of claim 1, wherein the first compare instruction is guarded by a first nonspeculative stage predicate, and wherein the first compare instruction and the second compare instruction permit cancellation of speculative stages and non-speculative stages during termination of the uncounted loop, and wherein the static predicate is set to a value zero to prevent execution of the second compare instruction when a new iteration of the uncounted loop is to be initiated.

10. A computer-implemented method of processing counted loops with early exits, the method comprising:
receiving an intermediate representation that includes multiple exit branches including an exit branch in the middle of the counted loop and a second exit branch from the counted loop;
performing an if-conversion on the intermediate representation, including converting the multiple exit branches into a single exit branch; and
performing a compare operation to set values of predicates that determine a path from the single exit branch from the counted loop.

11. A computer-implemented method of processing fully if-converted loops, the method comprising:
receiving an intermediate representation for a while loop, where an if-conversion has not been performed on multiple branches; and
performing an if-conversion on the intermediate representation, including removing some of the multiple branches after performing the if-conversion in order to obtain a single block, placing a first compare operation to guard multiple predicated instructions, and placing a second compare operation to guard an exit branch.

12. A computer-implemented method of processing uncounted loops with explicit branches of control flow, the method comprising:
receiving an intermediate representation, where a code is to be modulo scheduled and branches internal to the uncounted loop are to be if-converted and;
performing an if-conversion on the intermediate representation, including removing some of the branches after performing the if-conversion in order to obtain a single block, placing a first compare operation to guard multiple predicated instructions, and placing a second compare operation to guard an exit branch.

13. An apparatus for modulo scheduling, the apparatus comprising:
a modulo scheduler configured to assign a given stage predicate to each instruction in each stage including assigning a given stage predicate to each instruction in each speculative stage, the modulo scheduler configured to use the stage predicate to conditionally enable or disable the execution of an instruction during a prologue execution and an epilogue execution;
the modulo scheduler further configured to execute a first compare instruction inside an uncounted loop to determine if a new iteration of the uncounted loop is to be prevented and to set a static predicate to a value one if a new iteration of the uncounted loop is to be prevented and to execute a second compare instruction to terminate any subsequent iteration of the uncounted loop when the static predicate is set to the value one;
wherein the static predicate guards a second compare instruction and wherein the static predicate is in a kernel which is a code corresponding a steady state portion of a record of execution.

14. The apparatus of claim 13, wherein the modulo scheduler is further configured to use the static predicate to turn off stages in the epilogue while using a loop control compare to turn on and off speculative stages.

15. An article of manufacture, comprising:
a machine-readable medium having stored thereon instructions to:
assign a given stage predicate to each instruction in each stage, including assigning a given stage predicate to each instruction in each speculative stage;
use the given stage predicate to conditionally enable or disable the execution of an instruction during a prologue execution and an epilogue execution;
execute a first compare instruction inside an uncounted loop to determine if a new iteration of the uncounted loop is to be prevented;
set a static predicate to a value one if a new iteration of the uncounted loop is to be prevented, wherein the static predicate is in a kernel which is a code corresponding a steady state portion of a record of execution and wherein the static predicate guards a second compare instruction; and
execute the second compare instruction to terminate any subsequent iteration of the uncounted loop when the static predicate is set to the value one.

16. An apparatus for efficient code generation for modulo scheduled uncounted loops, the apparatus comprising:
means for assigning a given stage predicate to each instruction in each stage, including means for assigning a given stage predicate to each instruction in each speculative stage;
coupled to the means for assigning the given stage predicate, means for using the stage predicate to conditionally enable or disable the execution of an instruction during a prologue excecution and an epilogue execution;

means for executing a first compare instruction inside an uncounted loop to determine if a new iteration of the uncounted loop is to be prevented;

means for setting a static predicate to a value one if a new iteration of the uncounted loop is to be prevented, wherein the static predicate is in a kernel which is a code corresponding a steady state portion of a record of execution and wherein the static predicate guards a second compare instruction; and means for executing the second compare instruction to terminate any subsequent iteration of the uncounted loop when the static predicate is set to the value one.

* * * * *